March 22, 1932. G. GHISELLI 1,850,921
COMBINATION DRIVING AND STEERING AXLE FOR MOTOR VEHICLES
Filed Feb. 24, 1930 2 Sheets-Sheet 1

INVENTOR.
GUIDO GHISELLI.
BY Munn & Co.
ATTORNEYS.

March 22, 1932.    G. GHISELLI    1,850,921
COMBINATION DRIVING AND STEERING AXLE FOR MOTOR VEHICLES
Filed Feb. 24, 1930    2 Sheets-Sheet 2

INVENTOR.
GUIDO GHISELLI.
BY Munn & Co.
ATTORNEYS.

Patented Mar. 22, 1932

1,850,921

UNITED STATES PATENT OFFICE

GUIDO GHISELLI, OF SAN FRANCISCO, CALIFORNIA

COMBINATION DRIVING AND STEERING AXLE FOR MOTOR VEHICLES

Application filed February 24, 1930. Serial No. 430,995.

The present invention relates to improvements in a combination driving and steering axle for motor vehicles, such as may be used in a front wheel drive. The principal object of the present invention is to provide a simple mechanism for combining the steering feature with the driving mechanism in such a manner that neither operation interferes with the other. A further object of the invention is to so combine the two features that the front wheels always have a tendency to straighten out from any lateral excursion made necessary by turning around a corner.

A further object of the invention is to arrange the mechanism in such a manner that the vital parts are protected from dust and are adapted to retain grease without splashing the same.

A further object of the invention is to provide a brake mechanism in connection with the combined steering and driving mechanism.

A further object is to arrange the steering and driving device in such a manner that the several parts of the front axle which are connected by universal joints are all in straight alignment with one another, while the motor vehicle is engaged in straight-forward travel.

Further objects and advantages of my invention will appear as the specification proceeds.

Figure 1:
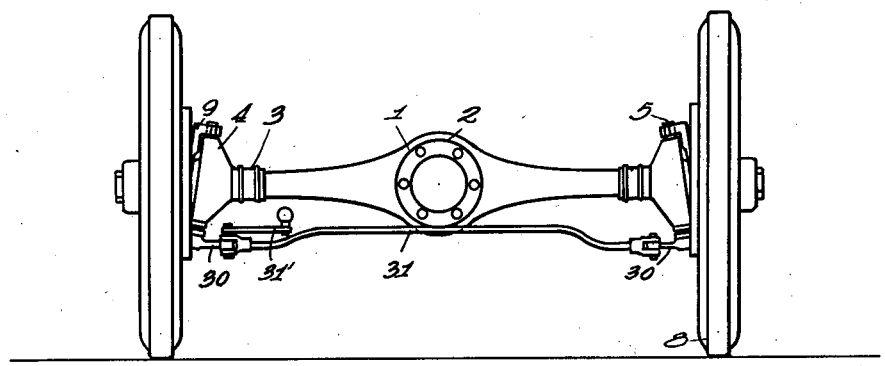
Figure 2:
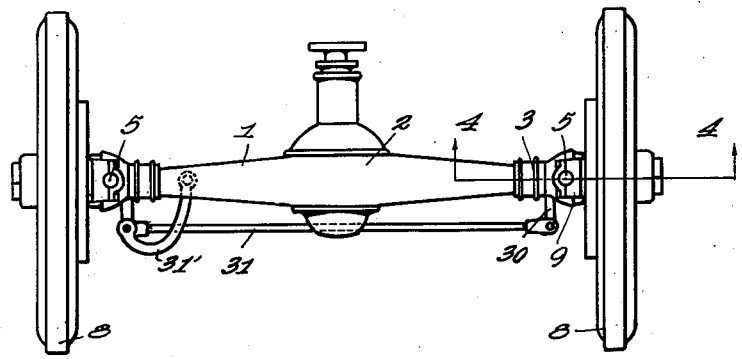
Figure 3:
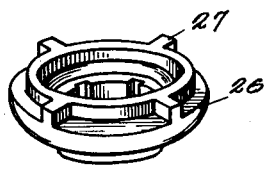

The preferred form of my invention is illustrated in the accompanying drawings in which Figure 1 shows a front view of the front wheels of a motor vehicle with the combined axle and steering arrangements, Figure 2 a plan view of the device illustrated in Figure 1;

Figure 3 a perspective detail view of a hub cap used in my arrangement, and

Figure 4:
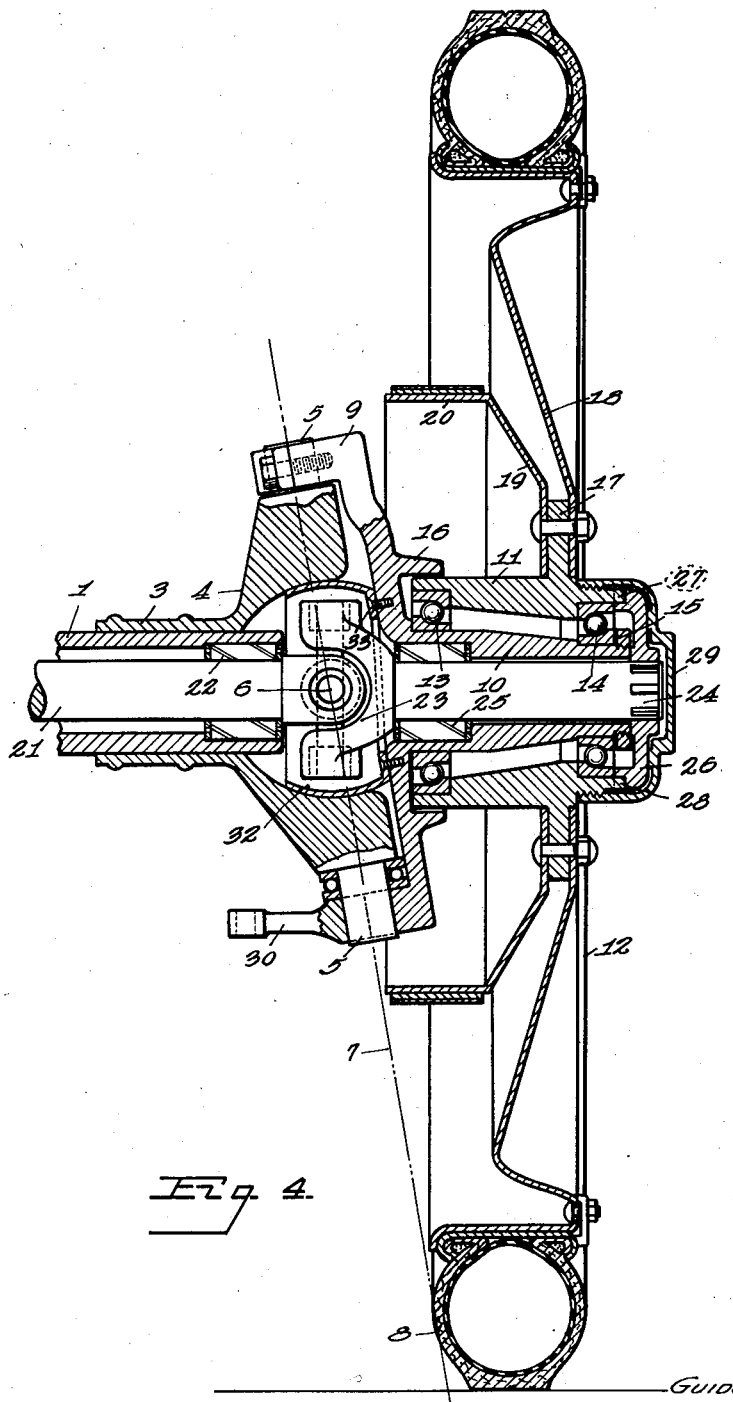

Figure 4 a vertical section through one end of the axle along line 4—4 of Figure 2.

While I have shown only the preferred form of the invention, I wish to have it understood that various changes or modifications may be made within the scope of the claim hereto attached without departing from the spirit of the invention.

The axle housing 1 has a central enlargement 2 for accommodating a conventional differential gear which does not form any part of my invention, and which therefore is not illustrated in detail. Each of the ends of the axle housing has a sleeve 3 fastened thereto, and the sleeve terminates in a socket 4 having two pins 5 extending therefrom in opposite directions. The cavity of the socket is semi-spherical and the center 6 of the cavity lies on the axis of the two pins 5. This axis which is shown in the broken line 7 lies in the vertical plane of the axis of the axle housing, but is somewhat inclined in said plane, so that its extension strikes the ground surface in close proximity to the inner edge of the tire shown at 8.

A hub section 9 is pivotally secured to the two pins 5 and has a sleeve 10 adapted for introduction into the hub 11 of the wheel 12. This hub is spaced from the sleeve by two ball bearings 13 and 14, and is held in place by means of a nut 15 threaded on the extreme end of the sleeve. A flange 16 extending from the hub section over the outer edge of the hub 11 prevents dust from entering into the space between the sleeve 10 and the hub 11. The latter has a flange 17 surrounding the same to which is fastened the disc 18, which supports the rim 8, previously mentioned, in the conventional manner. The flange 17 has also fastened to its inner face a housing 19 terminating in a cylindrical section 20, which is intended to serve as the brake drum.

In the inside of the axle housing 1 there is provided the floating axle 21. This axle extends on either side of the differential into the semi-spherical socket 4, and is supported immediately adjacent the socket by roller bearings 22. It is connected, within the socket, by means of a universal joint 23 to the outer shaft sections 24, which extend into the sleeves 10 and are supported in roller bearings 25. The center of the universal joint coincides with the center of the hemi-spheric cavity within the socket, and therefore lies on the center line 7 of the two pins 5. To protect the universal joint from dust and to allow grease to be held therein against leakage I provide a guard 32 of spherical outlines and fitting into the socket cavity. The guard is held in place by means of the screws 33. The extreme end of each shaft section 24 has a cap 26 splined thereto and this cap is formed, as shown in detail in Figure 3, with teeth 27 adapted for interlocking engagement with registering lugs 28 extending from the sleeve 11. A dust cap 29 is adapted to be threaded on the sleeve 11 in the manner shown.

The hub section 9 has an arm 30 extending therefrom and the two arms of the two hub sections are interconnected by means of a link 31 in the conventional manner. One of the arms 30 has an operating member 31' fastened thereto, which latter may be controlled by a suitable conventional mechanism from the steering wheel for turning the wheels on the pivots 5.

The manner in which the mechanism works will be readily understood from the foregoing description. To steer the wheels the arm 30 is operated and the wheels are made to swing on the pins 5. Since the axis of the pins 5 departs from the vertical, the wheels in swinging on the axis will have a slight raising effect on the front end of the car and when operation of the steering mechanism is discontinued, the wheels will automatically turn back into a straight-forward position. These operations do not interfere in any way with the driving mechanism which will be transmitted from the shafts 21 through the universal joints 23 to the outer shaft sections and the wheels.

It will be seen that the construction shown allows of easy access to the universal joint. After removal of the dust cap, the hub cap 26 and the nut 15, the wheel may be pulled off whereupon the hub section 9 may be readily removed.

I claim:

In a combination steering and driving means for a pair of wheels, an axle housing including end sockets fashioned with cavities therein and pins projecting laterally from the outer surface of the sockets, hub sections pivotally secured to the pins by removable caps, guards extending from the hub sections and snugly bearing against the walls of the cavity so as to form a closed chamber at each pivot, shafts mounted in the axle housings and attached to the wheels for operating the latter, and universal joints in the shaft disposed within the chambers.

Signed at San Francisco, in the county of San Francisco and State of California this 17th day of February A. D. 1930.

GUIDO GHISELLI.